United States Patent [19]

Seebeck

[11] 3,902,065

[45] Aug. 26, 1975

[54] SCANNER FOR THE RECORDING OF RADIOACTIVITY DISTRIBUTION

[75] Inventor: Uwe Seebeck, Hamburg, Germany

[73] Assignee: U.S. Philips Corporation, New York, N.Y.

[22] Filed: Aug. 3, 1973

[21] Appl. No.: 385,538

[30] Foreign Application Priority Data

Aug. 23, 1972 Germany ............................ 2241373

[52] U.S. Cl. .................................. 250/327; 250/366

[51] Int. Cl. ............................ G01t 1/20; G01t 1/36

[58] Field of Search ........... 250/327, 363, 366, 367, 250/369

[56] References Cited

UNITED STATES PATENTS

| | | | |
|---|---|---|---|
| 3,418,471 | 12/1968 | Gydesen | 250/369 |
| 3,428,805 | 2/1969 | Donato et al. | 250/367 |
| 3,573,458 | 4/1971 | Anger | 250/369 X |

*Primary Examiner*—Archie R. Borchelt
*Attorney, Agent, or Firm*—Frank R. Trifari; Ronald L. Drumheller

[57] ABSTRACT

In a scintiscanner comprising an upper measuring head and a lower measuring head and associated write heads, the activity distribution measured by the lower measuring head is recorded in the form of a mirror-image if the write heads in the two recording directions are moved in the same direction with respect to each other. However, if the write heads in the one recording direction are displaced opposite to each other, a correct recording is obtained, but it is then very difficult to compare the scintigrams recorded by the measuring heads. The invention describes a simple mechanical device by means of which the write heads can be moved in the same or in the opposite direction with respect to each other.

3 Claims, 4 Drawing Figures

SCANNER FOR THE RECORDING OF RADIOACTIVITY DISTRIBUTION

The invention relates to a scanner for recording the distribution of radioactivity in two mutually perpendicular directions, comprising an upper measuring head and a lower measuring head and associated write heads, it being possible to couple the write head associated with the upper measuring head mechanically rigidly to the upper measuring head.

A known scanner of this type is shown in FIG. 1. The drawing shows a housing 1, in which two measuring heads 2 and 3 are accommodated which can be moved in a plane above and below, respectively, the patient examination table 4. The measuring heads can be interconnected and, as is shown in the drawing, adjusted to each other. The upper measuring head 2 is rigidly coupled, by way of an arm 5, to two write heads, 6 and 7, which record the radiation measured by the measuring heads 2 and 3 on recording surfaces 8, 9. The radiation distribution in a plane which is scanned, for example, in a meander-like manner by the measuring heads 2 and 3 is thus recorded on the recording surfaces 8 and 9. The Scintigram thus recorded by the write head 7 associated with the measuring head 3, however, is a mirror image of the radiation distribution detected by this measuring head because, for example, a radioactive region which is situated on the left, as viewed from the lower measuring head, will be recorded on the right-hand side of the recording surface 9.

This effect can be avoided by guiding the write head 7 in the one direction not parallel but anti-parallel to the write head 6 of the upper measuring head 2.

On the other hand, the scintigrams recorded by the upper measuring head and the lower measuring head can be better compared if an activity region is recorded, for example, at the right in both scintigrams, even if it is "lefthand" detected by one probe.

Therefore, it is desirable to make the one write head record at option in the one direction parallel or anti-parallel to the direction of the other write head.

In scanners in which the write heads are not mechanically connected to the measuring heads and are controlled by step motors, this requirement can be readily satisfied by switching over the control of one step motor. Scanners of this kind, however, are more expensive and are more susceptible to breakdown than scanners having a mechanical connection between measuring heads and write heads.

The invention has for its object to provide a construction of a scanner of the kind set forth such that the other write head can be moved at option in a direction parallel or anti-parallel to the direction of the one write head. According to the invention, this object is achieved in that the other write head can be coupled to a guide member which cooperates with the one write head such that the member is displaced in the same and/or opposite direction upon displacement in a direction.

The invention will be described hereinafter with reference to one embodiment which is illustrated in the drawing, corresponding parts being denoted by the same references in all Figures.

Figure 1:
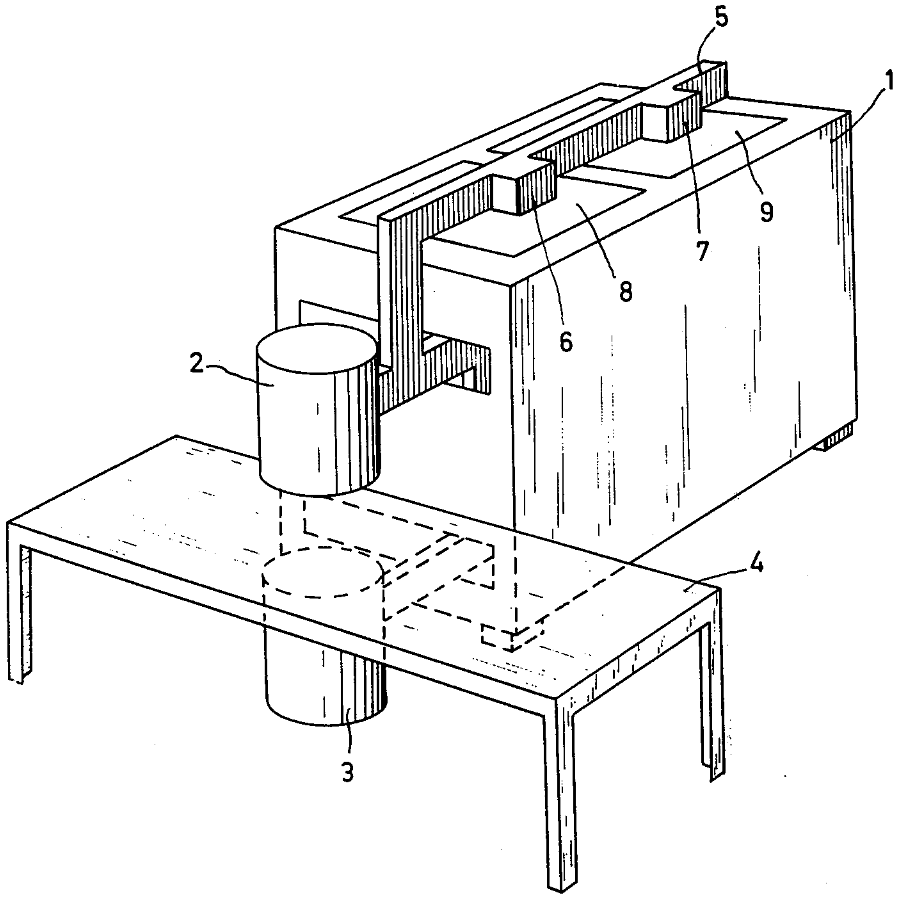
FIG. 1 is a prior art arrangement.
Figure 2:
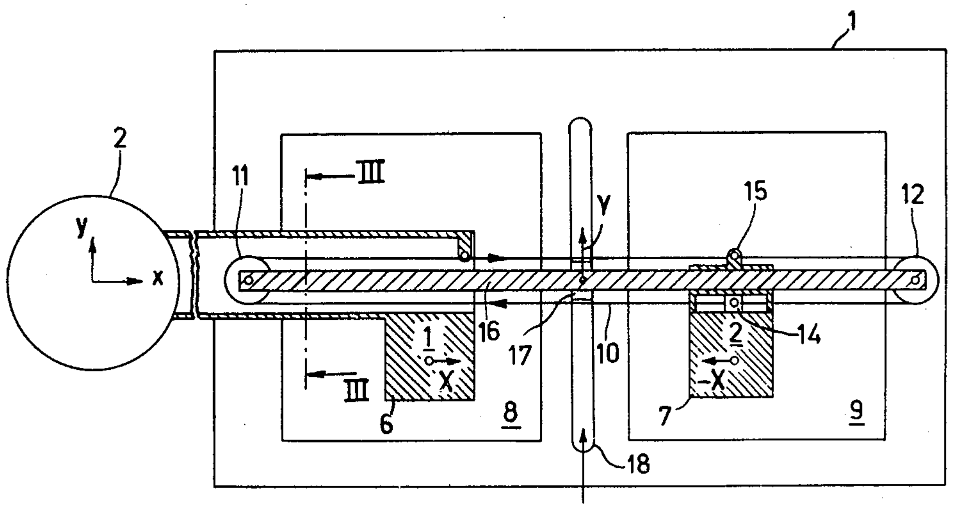
FIG. 2 is a plan view of a scanner according to the invention.

The scanner according to the invention differs from the known scanner shown in FIG. 1 in that the write head 7 which is associated with the lower measuring head 3 is not rigidly connected to the write head 6 for the upper measuring head 2. So as to guide the write head 7, a wire 10 is provided which is transported over two rollers 11 and 12 of the same diameter which are situated one behind the other in the drawing in the direction denoted by $x$. Because the rollers 11 and 12 cannot be displaced in the $x$-direction, one part of the wire 10 is displaced in the same direction and the other part is displaced in the opposite direction when the upper measuring head 2 or the write head 6 connected thereto is displaced. Therefore, the write head 7 is displaced in a direction which is the same as or opposed to that of the write head 6, depending on the coupling location with the wire 10. The coupling points are notably the points 14 and 15. The connection to the wire can be effected, for example, by way of a catch which cooperates with one of the eyelets provided on the wire parts (not shown).

Figure 3:
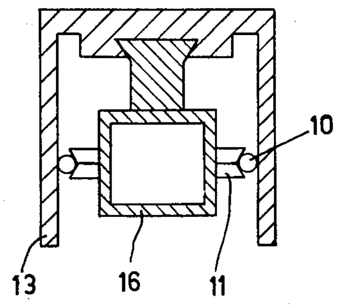
FIG. 3 shows the arrangement of the guide member.

The two rollers 11 and 12 are connected to a support arm 16 which is provided in a dovetail-like groove in arm 13 which extends in the $x$-direction (FIG. 3). If the measuring heads 2 and 3 are displaced in a $y$-direction, extending perpendicular to the $x$-direction, the support arm and hence the wire and the write head 7 connected thereto are displaced in the same direction as the write head 6 or the measuring heads 2 and 3, the support arm 16 then being guided in a guide slot 18 in the $y$-direction by means of a catch pin 17 connected thereto.

The write head 7 is thus displaced in the $y$-direction in the same direction as the write head 6 or the measuring heads 2 and 3 and in the $x$-direction at option in the same direction or in the direction opposite to that of the write head.

Figure 4:
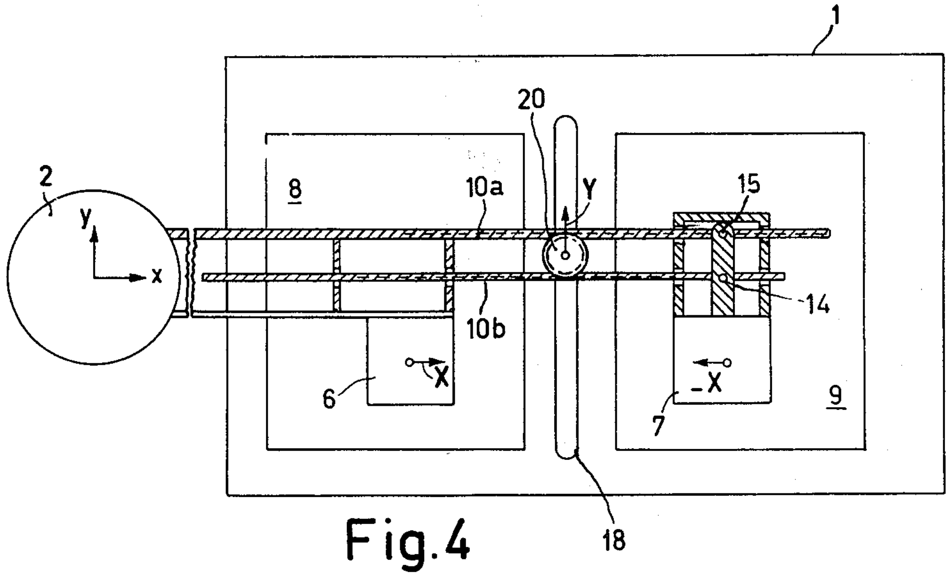
FIG. 4 is a plan view of an alternative scanner according to the invention.

A further embodiment which optionally offers parallel or anti-parallel movement of the two write heads is shown in FIG. 4. A gearwheel 20, the axis of which is perpendicular to the scanning surface $(x,y)$, is displaced only in the $y$-direction in accordance with the measuring head movements. The rotation of the gearwheel is produced by a toothed rack **10*a* — parallel to the $x$-axis — which is rigidly connected to the measuring head 2 and which moves only in the $x$-direction with respect to the gearwheel 20. A second toothed rack 10*b*, the gearwheel, is moved at the same speed as the first gearwheel, but in the opposite direction. The second write head 7** can then be coupled at option to the one or to the other toothed rack.

What is claimed is:

1. In radio diagnostic scanning apparatus having two opposing rigidly coupled radio detectors free to move in two orthogonal directions for simultaneous mechanical scanning of opposite sides of a body, an improved coupling arrangement for simultaneous mechanical driving of two corresponding writing heads, comprising:

a wheel free to rotate about its axis;

a straight guide track positioned in a first direction orthogonal to said wheel axis;

means slidable along said track supporting said wheel and limiting translational movement of said wheel to a direction parallel to said first direction;

two mechanical linkage elements engaging the periphery of said wheel and extending tangentially from opposite points on the circumference of said wheel in a parallel straight relationship in a second direction orthogonal to both the axis of said wheel and said first direction, said mechanical linkage elements having opposing motion in said second direction and being free to move in said first direction with said wheel;

means mechanically coupling said radio detectors to one of said mechanical linkage elements, whereby movement of said detectors in one of said orthogonal directions moves said one linkage element in said first direction and movement of said detectors in the other of said orthogonal directions moves said one linkage element in said second direction causing rotation of said wheel and movement of the other of said linkage elements in opposition thereto;

means mechanically linking one of said writing heads to one of said linkage elements; and means for selectively mechanically linking the other of said writing heads to either of said linkage elements, the resulting motion of said writing heads being either the same as each other or a mirror image of each other depending upon the linkage element to which said other of said writing heads is linked.

2. In radio diagnostic scanning apparatus, an improved coupling arrangement as defined in claim 1 and further comprising a second wheel supported by said means slidable along said track, said two mechanical linkage elements being portions of a flexible closed loop of material stretching between said wheels.

3. In radio diagnostic scanning apparatus, an improved coupling arrangement as defined in claim 1 wherein said two mechanical linkage elements are toothed racks and said wheel is a toothed gear corresponding thereto.

* * * * *

UNITED STATES PATENT AND TRADEMARK OFFICE
CERTIFICATE OF CORRECTION

PATENT NO. : 3,902,065
DATED : August 26, 1975
INVENTOR(S) : UWE SEEBECK

It is certified that error appears in the above-identified patent and that said Letters Patent are hereby corrected as shown below:

Column 2, line 50, after "10b," should be as follows:

--also extending parallel to the x-axis and cooperating with--.

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*